Nov. 9, 1954
R. M. VAUGHAN ET AL
2,693,826
WATER MIXING VALVE AND ASSEMBLY
Filed Jan. 17, 1949
3 Sheets-Sheet 1
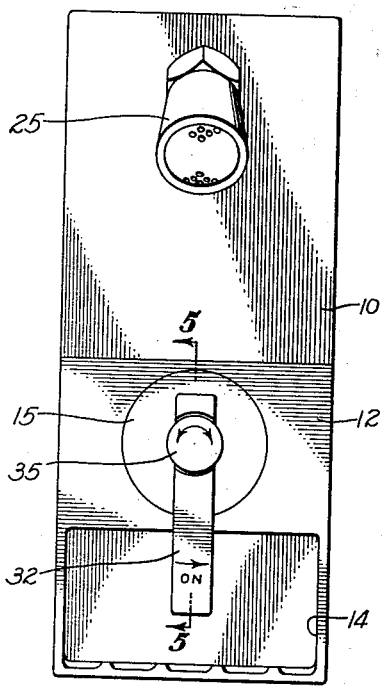
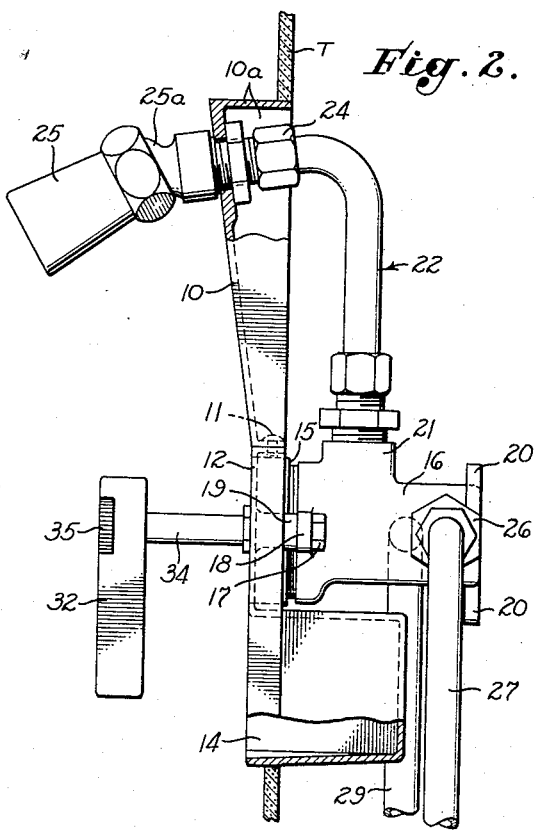
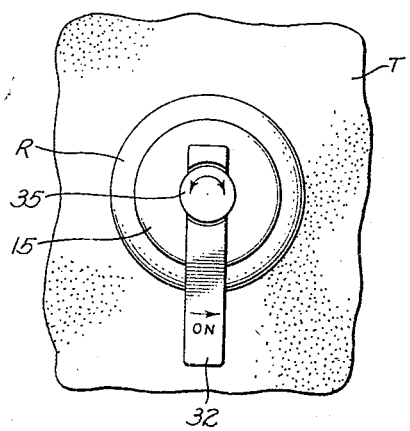
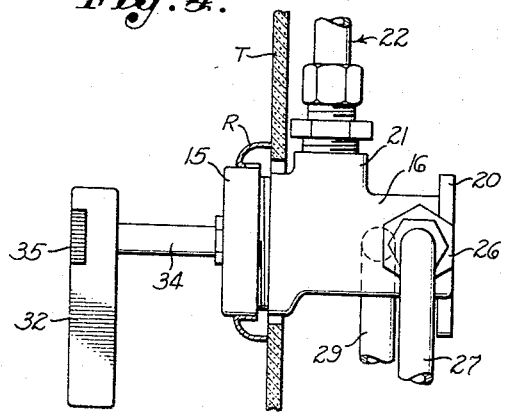
INVENTORS.
RICHARD M. VAUGHAN
LAWRENCE F. LEAVITT
BY THEIR ATTORNEYS.
HARRIS, KIECH, FOSTER & HARRIS
BY
Clarence F. Kiech

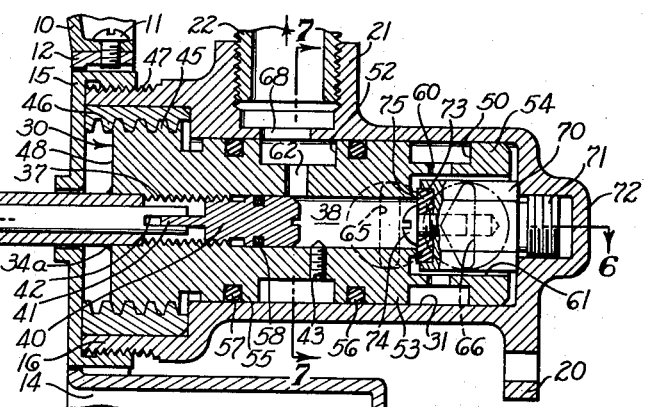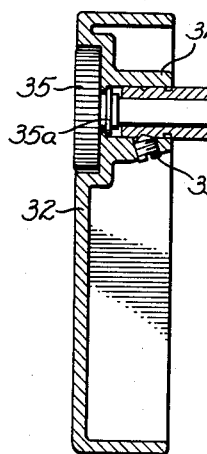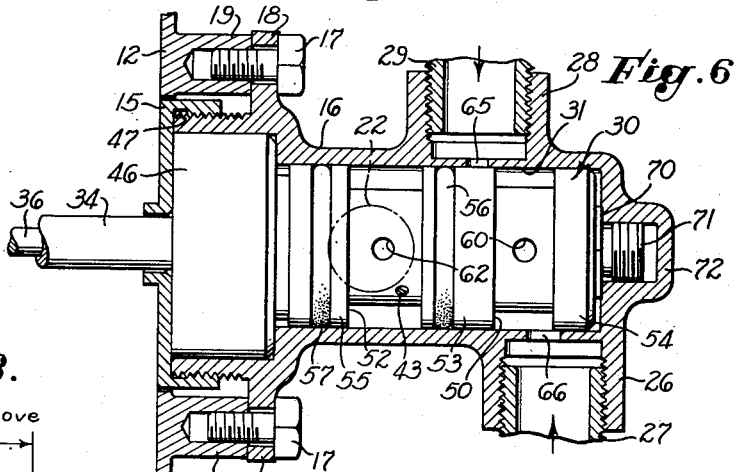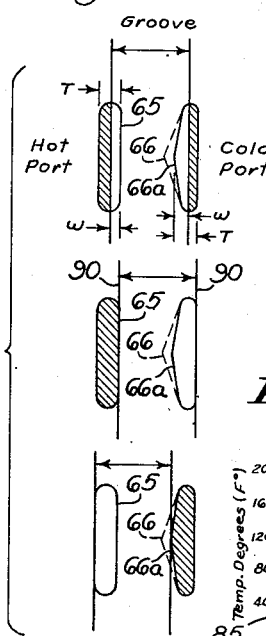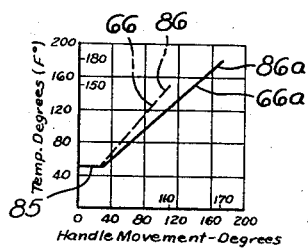

INVENTORS.
RICHARD M. VAUGHAN
LAWRENCE F. LEAVITT
BY THEIR ATTORNEYS.
HARRIS, KIECH, FOSTER & HARRIS

United States Patent Office 2,693,826
Patented Nov. 9, 1954

2,693,826

WATER MIXING VALVE AND ASSEMBLY

Richard M. Vaughan, Beverly Hills, and Lawrence F. Leavitt, Los Angeles, Calif.

Application January 17, 1949, Serial No. 71,232

12 Claims. (Cl. 137—637.2)

This invention relates particularly to mixing valves of the general type used in connection with hot and cold water installations for household, hotel and similar uses, including showers, tubs, lavatories, kitchen sinks, and the like, as well as to shower head mountings and assemblies. This invention relates also to valves in general for the mixing of any two liquids or gases.

A principal object of the invention is to provide an inexpensive, efficient mixing valve structure, with an externally operated volume control, which is positive and simple in its operation, may be controlled by a single twist of the wrist, and is at the same time relatively simple to manufacture, assemble, install and service. It is also an object of the invention to provide such a valve which is not overly sensitive, yet is so designed with differential ports that a linear relationship exists between handle movement and the temperature of the mixture.

In prior structures for the indicated purpose, it has been common to employ structures of a costly and highly complicated nature and composed of an excessively large number of parts which in many instances have been subject to serious difficulties in connection with installation, operation and maintenance and have therefore been quite unsatisfactory. Such structures, moreover, have offered many objectionable manufacturing difficulties.

It is, therefore, another object of this invention to furnish a mixing valve for purposes such as stated which will permit simplification in manufacture and, in addition to providing for simple operation, will also offer long life and minimize repair operations.

It is a still further object of the invention to provide a mixing valve which shall include a simple means of providing an adjustment for volume control which will remain in any given condition of adjustment during operation of other portions of the mixing valve mechanism to control temperatures as desired.

An additional object is to provide a mixing valve for shower installations and the like by means of which a single manipulation by the user will serve to initiate water flow and also to adjust the temperature to suit the user's need, another equally simple, single operation serving to regulate water flow.

It is also an object of the invention to provide a novel and highly efficient arrangement and a size relationship of hot and cold water inlet ports that will eliminate the necessity for criticality in adjustment during temperature regulation and thereby insure against accidental scalding.

It is additionally an object of the invention to provide in combination with a mixing valve structure, a shell or hood assembly which properly positions any appropriate shower head with respect to the mixing valve, and also a soap receptacle so disposed with respect to a handle of the mixing valve that such handle when in closed position prevents ready access to soap in the receptacle, it being necessary to move the handle to water supplying position before the soap can be readily reached.

Other objects of the invention, together with various structural features thereof, will become apparent to those skilled in this art upon reference to the following specification and accompanying drawings wherein certain embodiments of the invention are disclosed for the purpose of exemplification.

In the drawings:

Fig. 1 is a front elevation of an assembly embodying the improvements of this invention;

Fig. 2 is an elevation of the structure of Fig. 1 taken from the right side of Fig. 1, some portions being broken away to facilitate illustration;

Fig. 3 shows a modified form of mounting for the mixing valve of this invention, the view being a front elevation;

Fig. 4 is a side elevation taken from the right side of Fig. 3;

Fig. 5 is a fragmentary, vertical longitudinal sectional view taken approximately from the line 5—5 of Fig. 1;

Fig. 6 is a horizontal section taken from the line 6—6 of Fig. 5;

Fig. 7 is a vertical cross section taken on the line 7—7 of Fig. 5;

Fig. 8 is a diagrammatic view indicating various port relationships under different conditions of operation;

Fig. 8a is a curve of the resultant water flow;

Figure 9:
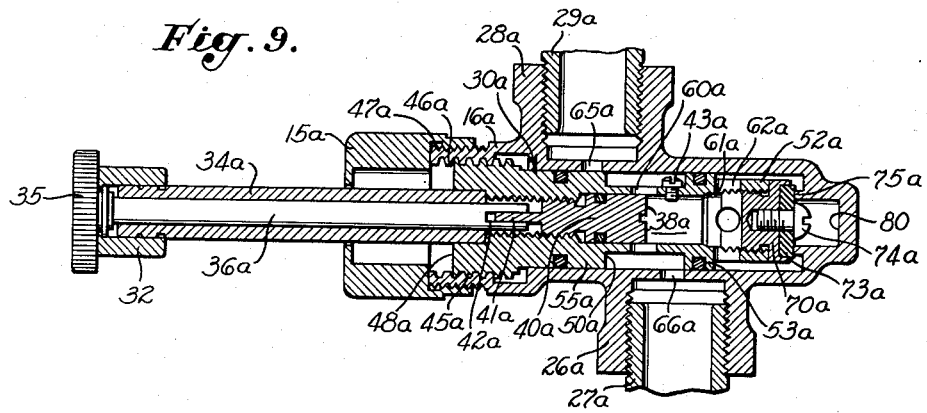
Fig. 9 is a horizontal longitudinal section corresponding in general with that of Fig. 6 and showing a slightly modified form of mixing valve construction.
Figure 10:
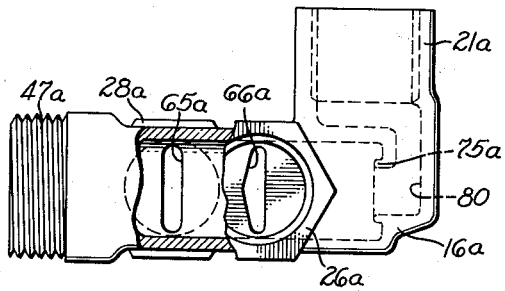
Fig. 10 is a side elevation of the valve housing shown in Fig. 9, a portion being broken away to facilitate the showing of the port arrangement.
Figure 11:
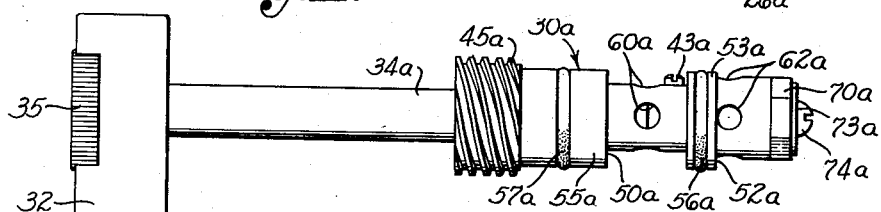
Fig. 11 is an elevation of the valve barrel and handle shown in Fig. 9.

The form shown in Figs. 1 to 7 constitutes a combination of a mixing valve, a soap receptacle and a shell or hood assembly whereas Figs. 9 to 12 show only a mixing valve of slightly modified construction.

Having reference to Figs. 1 to 7, there is shown a flanged upper shell or hood 10 of substantially rectangular construction which is secured by screws 11 or the like to the top of a flanged, rectangular bracket or mounting plate 12 which has integrally formed therewith an underlying rearwardly extending soap receptacle 14. Centrally disposed within the mounting plate 12 is a forward valve cap 15 mounted upon the forward end of a valve housing 16 through the medium of bolts 17 passed through ears 18 at the sides of the valve housing and threaded into bosses 19 integrally carried at the rear of the mounting plate 12. The opposite end of the valve housing 16 may be provided with attachment lugs 20 for use where the assembly as a whole is required to be mounted upon studding or the like.

As illustrated in Fig. 2, for example, the upper side of the valve housing 16 is provided with an upstanding internally threaded boss 21 for the reception of appropriate fittings and an upstanding mixed water pipe all which are generally indicated at 22. The upper end of the pipe 22 is curved forward to enter any standard type of fitting 24 serving to mount on the front wall of the shell or hood 10 any preferred or conventional shower head 25 which is shown as having a universal joint 25a by means of which the shower head is adjusted. As illustrated the shell or hood 10 is provided with flanges 10a extending rearward so that they may be mounted within the confines of tiles T or other wall forming material.

The valve housing 16, in addition to being provided with the upstanding boss 21 and the mixed water pipe 22, is also provided on its right side with a cold water boss 26 adapted to receive a fitting and pipe 27 for cold water, the valve housing 16 being additionally provided upon its left side in staggered relation to the boss 26 with a hot water boss 28 for connection of a fitting and pipe 29 for hot water.

Disposed within the valve housing 16 is a valve barrel 30, the valve barrel 30 having an operative fit in a cylinder bore 31 extending axially from front to rear of the valve housing 16. The valve barrel 30 is operated by a handle 32 lying forward of the mounting plate 12 and the soap receptacle 14, the handle 32 being provided with a rearwardly directed boss 32a carrying a set screw 33 (Fig. 5) by which the handle 32 is rigidly affixed to the outer end of a tubular valve stem 34 which is in turn rigidly affixed to the forward end of the valve barrel 30 as by means of a press fit and brazing indicated at 34a. By so mounting the handle 32, it is adapted to lie immediately forward of the mouth of the soap receptacle 14 when the handle 32 is placed in the vertical position illustrated in Figs. 1 to 4, which position is that assumed when water is not being used. In this manner, ready removal of soap from the soap receptacle 14, except when water is being used, is largely prevented. However, where the mixing valve alone is to be employed, the shell or hood 10, the mounting plate 12 and the soap receptacle 14 may be omitted as in Figs. 3 and 4. In such an instance any conventional escutcheon plate or decorative ring R may be employed to cover the joint between the valve cap 15 and the tile T.

As indicated in Figs. 1 and 2, and as best seen in Fig. 5, the handle 32 carries a knurled knob 35 axially aligned with the hollow valve stem 34, the knob 35 being largely countersunk in the handle 32 and having its edge portions projecting from the sides of the handle 32 so they may be readily grasped by the fingers for manipulative purposes. This knob 35 is shown as being retained against axial withdrawal by means of a snap ring 35a bearing against a suitable, annular flange or other obstruction carried by the seat portion of the handle 32. Axially fixed in the knob 35 is a control shaft 36 which is journalled in the tubular valve stem 34 and extends inward therethrough into a threaded outer portion 37 of a bore 38 in the barrel 30. The bore 38, which extends inward to the end of the valve barrel 30, receives a flow control plug 40 whose outer end is threaded and is received in the threads 37 for helical adjustment. To effect adjustment the plug 40 is provided with a flat tongue 41 and the adjacent end of the control shaft 36 is provided with a slot 42 which receives the tongue 41. Thus, rotation of the knob 35 and the control plug 40 shifts the plug axially by reason of the directing function of the threads 37. Forward movement of the plug 40 is limited by a stop screw 43 so that over-adjustment of the plug 40 may be avoided and disengagement prevented. As presently to be described, the control plug 40 serves to regulate the volume of water being dispensed, as distinguished rom its temperature. In addition the plug 40 is provided with a slotted end as shown for use in insertion and removal from the bore 38 with a screw driver or other tool.

Axial movement of the valve barrel 30 during rotary motion imparted through the handle 32 is effected through the medium of external threads 45 which are provided on the outer end portion of the barrel 30, these external threads 45 cooperating with internal threads 46 which may be formed in a ring press fitted into position in the outer end of the valve housing 16, as seen in Fig. 5, or might be integrally formed in the outer end of the valve housing 16a as exemplified in Fig. 9. The thread section 45 is shorter than the thread section 46 and the differential is a measure of the amount of axial movement of the valve barrel 30. The outward movement of the valve barrel 30 is limited by the valve cap 15 whose inner wall bears against the ends of the thread section 46 and the valve housing 16, the cap 15 being retained by mounting upon external threads 47 provided on the respective end portion of the valve housing 16. Thus, upon rotation of the handle 32 in a counterclockwise direction, the maximum axial movement of the valve barrel 30 is accomplished when the outer end 48 of the valve barrel strikes the inner wall of the valve cap 15 through which the operating valve stem 34 extends as shown. The pitch of the threads 45 and 46 is such that full valve movement is produced by less than a 180° turn, for example 165°.

The inner end portion of the valve barrel 30 is provided with an annular water receiving and mixing groove 50, and an intermediate portion of the valve barrel 30 is provided with an annular water discharge groove 52, these grooves being separated by a land 53. At the innermost end of the valve barrel 30 the correspondnig side of the groove 50 is defined by a land 54, and similarly the outer side of the groove 52 is defined by a land 55. These lands 53, 54 and 55, which act in part as regulating valves, are machined to provide an accurate working surface within the cylinder bore 31. In addition, it is desirable to provide the lands 53 and 55 with packing rings 56 and 57 respectively, which rings are circular in cross section in the form illustrated and of the type commonly known as O-rings or donut rings. The ring 57 is particularly important to prevent passage of water to the threads 45 and 46. Similarly, it is important to provide a small sealing ring 58 of the donut type in the control plug 40.

Radially formed through the wall of the valve barrel 30 at the bottom of the receiving groove 50 are ports 60 which provide for communication between the annular groove 50 and a counterbore 61 constituting an extension of the barrel bore 38. In this particular form the ports 60 constitute inlet ports but in the slight modification of Figs. 9 to 12 the corresponding ports may be outlet ports. Leading through the body of the barrel 30 from the bottom of the discharge groove 52 are radial ports 62 which also communicate with the barrel bore 38. Thus the barrel bore 38 constitutes a connection between the ports 60 and the ports 62 and also provides a mixing chamber when the water travels between the inlet pipes 27 and 29 and the outlet pipe 22.

As seen in Figs. 5 and 6, hot water passes from the pipe 29 to the groove 50 (when the valve is open) by way of a hot water inlet port 65 in the valve housing 16 at the base of the hot water boss 28, and cold water passes from the cold water pipe 27 to the groove 50 by way of a cold water inlet port 66 through the wall of the valve housing 16 at the base of the cold water boss 26. Water leaving the bore 38 through the ports 62 by way of the annular groove 52 passes to the mixed water outlet pipe 22 by way of an outlet port 68 at the base of the outlet boss 21.

Both in the form of construction shown in Figs. 1 to 7 and the form shown in Figs. 9 to 12, the inner end of the valve barrel 30 and the inner end of the valve housing 16 are provided with stop valve means for completely cutting off water flow when the handle 32 is in the vertical position illustrated and permitting water flow when the handle 32 is moved in a counterclockwise direction. However, such valve arrangement in one form in general is the reverse of the valve arrangement in the other form, the waterflows in general being in reverse of each other.

As illustrated in Fig. 5, the stop valve includes a valve washer retainer in the form of a hexagonal plug 70 having a reduced threaded extension 71 received in a threaded boss 72 at the closed end of the valve housing 16. This plug 70 is received in the counterbore 61 and it carries at its free end a washer 73 retained in any conventional manner such as by a round head machine screw 74. The washer 73 is axially disposed to cooperate with a valve seat 75 integrally formed in the adjacent end portion of the valve barrel 30 at the base of the counterbore 61, such seat 75 being an annular lip as illustrated. With this construction, the hexagonal plug 70 may be readily installed and removed by means of an appropriate wrench, and as a consequence the washer 73 may be easily renewed. Similarly, by removal of the valve cap 15, the whole valve barrel 30 may be removed.

As will be apparent from the foregoing description, opening of the stop valve at the valve seat 75 and at the ports 65 and 66, together with appropriate regulation of the temperature, is effected by swinging the handle 32 counterclockwise. Since complete opening of the valve is effected by turning the handle 32 through an arc of only about 160° to 170°, the initial portion of the turn has the effect of withdrawing the valve seat 75 from the washer 73 a distance to provide for substantially full water flow, such full water flow being determined by the position of the control plug 40 in the outer portion of the barrel bore 38. Turning of the handle 32 as indicated causes the inner land 54 to progress axially outward across the cold water port 66 and progressively close the same. After a limited amount of movement to close the port 66 has occurred, the inner edges of the land 53 then began to move across the hot water port 65 to open the latter. The rate of axial travel of the two lands 53 and 54 is the same, but in order to eliminate the necessity for very critical adjustment as the handle 32 is turned, the port 66 is tapered toward an apex disposed in the direction of outward axial travel. The land 54 reaches the outer ends of the tapering walls of the port 66 at the same time that the land 53 begins to uncover the port 65.

Thus, the volume of cold water that is cut out by the land 54 upon a given valve movement is smaller than the volume of hot water cut in by the land 53 upon the same valve movement. Therefore, a differential flow is produced such that a linear relationship is achieved between handle movement and temperature of the mixture. In other words, because one of the ports is shaped differently from the other, temperature regulation in a substantially direct linear relationship may be accomplished, whereas, if the two ports were of the same size, the result would be a non-linear relationship because of the fact that the colder temperature tends to predominate in the mixture. In any event, the tapering of the cold water inlet port renders gradual temperature regulation comparatively easy. The hot and cold water streams entering through the ports 65 and 66 are partially mixed in the annular groove 50, whence they pass through the ports 60 in the barrel 30 into the barrel bore 38 wherein further mixing occurs and whence the mixed water passes out through the ports 62 into the annular discharge groove 52 and thence by the outlet port 68 to the mixed water pipe 22 leading to the spray head 25.

Since the knob 35 is initially set to position the control plug 40 with respect to the ports 62 so as to give any desired volume of water, such volume remains substantially constant as the handle 32 is turned to regulate the temperature. As will be apparent, the water is shut off simply by turning the handle 32 in a clockwise direction until it assumes the vertical position shown, whereupon the valve seat 75 engages the valve washer 73 and all flow ceases.

Figure 12:
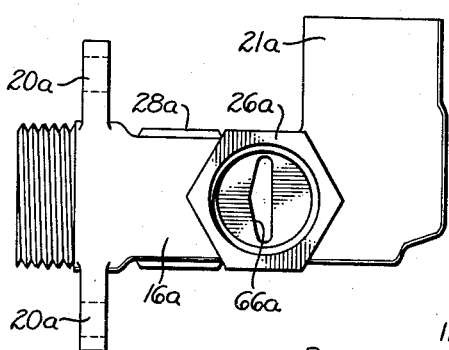
Fig. 12 is a side elevation showing the valve housing of Fig. 10 provided with external attachment means to be employed when such means are required.

In the construction of Figs. 9 to 12, the shell or hood 10 for positioning the shower head 25, the bracket or mounting plate 12 and the soap receptacle 14 of the other form are all omitted, but they may be used by employing ears 20a as indicated in Fig. 12. Inasmuch as this structure is much lighter in weight, it may be readily supported solely upon the cold and hot water pipes 27 and 29.

In general, the construction of Figs. 9 to 12 is substantially the same as that of the construction of Figs. 1 to 7 except that, as previously indicated, some of the elements are reversed and provide for a generally reverse flow of water. According to this form, the hot and cold water inlet bosses 28a and 26a are positioned forwardly on the valve housing 16a, and the outlet boss 21a is positioned at the rear of the valve housing 16a. Since similar parts of this form are sufficiently indicated by attaching the letter a to the same reference numerals as are used in discussing the form of Figs. 1 to 7, only those parts of the Figs. 9 to 12 will be described which represent significant differences. The mountings of the valve barrel 30a, the tubular valve stem 34a, the handle 32a, the knurled knob 35a, the control shaft 36a and the control plug 40a, are all the same. As to the cooperating stop valve parts at the inner end of the valve housing 16a and the inner end of the valve barrel 30a, the integral, annular valve seat 75a is formed on the inner end of the housing 16a, and the valve washer 73a is mounted in a seat provided in a hexagonal plug 70a which is threaded into an internally threaded extension of the barrel bore 38a, the barrel end being counterbored at 61a for this purpose. Here, the hot water mixing and receiving groove 50a is disposed about the intermediate portion of the valve barrel 16a, and the annular mixed-water discharge groove 52a is disposed at the inner end of the barrel 30a beyond the land 53a. The hot water inlet port 65a and the cold water inlet port 66a communicate with the annular mixing groove 50a in the same manner as in the other form and the radial ports 60a pass such mixed water into the barrel bore 38a in a similar manner. However, the cold water port 66a is gradually closed by one edge of the land 53a and the hot water port 65a is gradually opened by one edge of the land 55a, thus effecting easy temperature regulation. Since the radial water outlet ports 62a in the barrel 30a conduct the mixed water from the bore 38a to the annular groove 52a, and since the water travels (when the valve is open) past the valve seat 75a to a channel 80 at the end of the valve housing 16a which supplies such mixed water to the outlet boss 21a, in order to permit such passage of the water from the annular groove 52a to the channel 80, no land is provided at the end of the barrel 30a to correspond with the land 54 of the other form. However, donut packing rings 56a, 57a and 58a are employed in substantially the same locations as in the other form and for the same purposes.

For the purpose of further description of the relationship between the hot water inlet ports 65 and 65a and the cold water inlet ports 66 and 66a, reference is made to the diagrammatic showing of Fig. 8 and the water flow curve of Fig. 8a. In Fig. 8 the hot water port of both forms is indicated at 65, one cold water port (which is exemplified in Figs. 9 to 12) is indicated at 66a, and a slightly modified form of cold water port (as exemplified by Figs. 5 and 6) is indicated at 66. The curve shown in Fig. 8a assumes a normal cold water temperature of about 50° F. and a normal hot water temperature of 180° F. These temperatures are representative of conditions most commonly found in homes, hotels, et cetera. The first horizontal portion 85 of the curve serves to indicate that only cold water is introduced during approximately the first 25° to 30° of movement of the handle 32. As previously explained, the adjustment of the control plug 40 determines total volume passed by the valve, the valve seat 75 (or 75a) being adequately disengaged during the first 20° or 25° of handle movement to provide for maximum volume determined by the position of the control plug 40. Following that portion of the valve opening which admits only cold water, further opening of the valve provides for temperature regulation having a direct linear relationship to handle movement. Thus, temperature increases as a straight line function, represented by the inclined curve portions 86 and 86a, to the maximum temperature which is a non-scalding temperature of about 150° when the port 66 is used, as indicated by the curve portion 86, and is the full temperature of about 180° when the port 66a is used, as indicated by the curve portion 86a. The valves of this invention provide for reaching of maximum temperature at a total handle movement of perhaps 110° with the structure of Figs. 5 and 6, or a somewhat greater movement within the range of a single twist of the wrist of about 160° to 170° with the modified form of Figs. 9 to 12.

Such port relationships as indicated by the curve of Fig. 8a provide for passage of cold water alone, or water of any regulated temperature up to a maximum temperature, or hot water alone of the maximum temperature. However, especially for shower use in homes, hotels and the like where hot water temperatures approach 180° F., it is desirable to arrange the port 66 so that some cold water flow will be permitted at all times, whereby to avoid scalding. This result is indicated by the curve portion 86 which signifies a non-scalding temperature condition. In Fig. 8 the full line cold water port 66a is representative of a port arrangement providing for maximum water temperature, whereas the dotted line position 66 is representative of a port arrangement such that some cold water always is admitted.

In indicating the relationship of the ports 65, 66 and 66a in Fig. 8, the crosshatch portions indicate closed ports or portions of ports, and the clear portions indicate open ports or port portions, the spacing of the side lines 90 representing the width of the annular grooves 50 and 50a. As seen in Fig. 6, the right edge of the land 53 overlaps the hot water inlet port 65 to a sufficient extent to provide for admission of cold water only as represented by the portion 85 of the curve of Fig. 8a. As the valve barrel 30 is moved toward the left of Fig. 6, the port 66 begins to close by action of the land 54 and the hot water port 65 begins to open. At the top of Fig. 8, the hot water port 65 is indicated as being about one-half open, and so far as the port width is concerned the cold water port is about one-half closed. However, since the port 66 is tapered in the direction of valve movement to provide hot water, and due to the fact that the temperature of the cold water is the predominant factor, the actual reduction in cold water volume takes place more slowly than the increase in hot water volume. The second position in Fig. 8 represents the condition when the hot water port is entirely closed and the third position in Fig. 8 represents the condition when the hot water port is entirely open. As indicated here, when the valve relationship of Figs. 9 to 12 is employed, the port 66a is entirely closed when the hot water port 65 is fully opened, but when the port relationship of Figs. 5 and 6 is employed, the port 66 is never entirely closed, the tip thereof remaining open at all times, even when the hot water port 65 is fully open. From the foregoing, it will be apparent that, by angling or otherwise tapering the walls of the cold water ports 66 and 66a, a substantially linear relationship with respect to handle movement is obtained during temperature regulation, whereas, if both the hot water and cold water ports were of the same design and size, the relationship would be non-linear and extreme care in adjustment would be required in order to obtain a desired temperature condition. By the present construction such extremely critical adjustment to effect desired regulation is avoided.

*Operation*

In operating the mixing valve structure of this invention, counterclockwise movement of the handle 32 is accomplished easily by a single twist of the wrist, such movement being preferably confined to a total less than 180° and being desirably maintained between limits of about 110° and 175°. As has been previously explained, the control plug 40 is originally adjusted to provide for any desired total volume through the discharge ports 62 or 62a to the discharge groove 52 or 52a and thence to the mixed water pipe 22. Thus, opening of the valve by movement of the handle 32 has only the effect of regulating the temperature, once the initial rotary movement has been accomplished to pass sufficient cold water as represented by the portion 85 of the curve in Fig. 8a. The regulation of temperature through the functioning of the hot and cold water ports 65, 66 and 66a is that fully explained above. When the handle 32 is moved in a clockwise direction until disposed in a vertical position as illustrated in Figs. 1 to 4, the water flow is entirely cut off at the valve seat 75 or 75a.

According to one practical construction of this invention the width of the hot water inlet port 65 or 65a may be 5/32 inch and the amount of overlap of this port by the respective land during the opening of the cold water port 66 may be 1/32 inch, the overall effective width of the port 66a being about 3/16 inch and the overall effective width of the port 66 being about 1/32 inch greater or about 7/32 inch. Thus, the last thirty-second of an inch of the port 66 is a measure of that portion of the cold water flow which is never cut off.

Also, the tapering edge portions of the cold water port 66 or 66a serve to establish the direct linear relationship previously described. This is brought about because of the fact that it serves to correct for the previously mentioned cold factor which is the predominant element involved in obtaining the water mixture. If the present cold water port construction were not employed and both ports were the same in size and outline, a much larger movement of the handle would be required in the beginning of the cycle for any particular increment of temperature rise than would be required near the end of the cycle, and the movement near the end would be critical.

When the handle 32 is in the vertical position illustrated in Figs. 1 to 4, that is when water flow is checked, the soap dish 14 is so guarded by the handle as to make removal of a cake of soap substantially impossible. Thus the soap is made available only when the handle 32 is in a water dispensing position. In view of the mounting of the hood 10 upon the valve housing 16 through the medium of the bracket or mounting plate 12, proper adjustment of the spray head 25 may be accomplished without springing or otherwise disturbing the mounting of the mixed water supply pipe 22.

It will be understood that references to hot and cold water in this specification and the claims are used in a general sense to refer to all fluids which might be mixed by the valve structure described and claimed.

Since modifications of the generic invention herein disclosed will no doubt occur to those skilled in this art, it is intended to protect all such variations as fall within the scope of the patent claims.

We claim as our invention:

1. A mixing valve comprising in combination: a valve housing having a cylinder bore and a hot water inlet and a cold water inlet leading directly into the sides of said bore, and a mixed water outlet leading from said bore; a valve barrel rotatable and reciprocable axially in said bore, said barrel and housing having outer cooperating ends; and interengaging thread means on the outer cooperating ends of said barrel and housing for imparting helical movement to said barrel, said barrel having a bore and a pair of spaced circumferential grooves, at least one of which grooves is located adjacent its inner end said barrel having port means respectively connecting said spaced grooves with said bore of said barrel, one of said grooves being arranged adjacent to and for direct communication with both of said hot and cold water inlets of said housing and the other of said grooves being arranged adjacent to and for direct communication with said mixed water outlet.

2. A combination as in claim 1 wherein the inner end of said valve housing and an inner end portion of said barrel only are provided with cooperating stop valve means whereby such valve means act to stop mixed water flow upon inward movement of said barrel.

3. A combination as in claim 1 including a control member axially movable and axially located within said barrel and extending into said barrel bore to control water movement between said barrel bore and one of said circumferential grooves through the respective port means.

4. A combination as in claim 1 wherein circumferential lands on said barrel define said grooves and serve as valve means to cover and uncover said hot and cold water inlets.

5. A combination as in claim 4 including packing rings carried in certain of said lands and sealing said valve barrel in said bore of said valve housing to prevent by-passing of hot and cold water.

6. A combination as in claim 4 wherein said hot and cold water inlets are of different areas and shapes and are disposed with respect to said lands for gradually closing said cold water inlet as said hot water inlet is gradually opened upon axial movement of said valve barrel, cold water flow decrease being at a different rate from hot water flow increase.

7. A combination as in claim 6 wherein the area of said cold water port reduces in the direction of barrel travel with respect to the corresponding area of said hot water port to effect the cold water flow decrease as said hot water flow is increased.

8. In combination in a mixing valve: a housing provided with a bore and provided with a pair of inlet ports and an outlet port; a valve barrel mounted to move axially in said bore and providing valve means moving axially across some of said ports to increase fluid flow through one of said ports and simultaneously decrease fluid flow through another of said ports, said barrel having a fluid passageway therein and spaced port means between said passageway and said bore; control means adjustably carried by said valve barrel and axially movable therein adjacent one end of said passageway and adjacent one of said port means to control the volume of fluid flowing through the last mentioned port means; handle means to move said valve barrel; and actuating means for said control means and exposed adjacent said handle means, said control means and its actuating means remaining in set position with respect to said handle and barrel upon movement of said handle and barrel whereby to maintain substantially constant the volume of mixed fluid passing said control means throughout the mixing range.

9. A combination as in claim 8 wherein said valve barrel is provided with spaced annular lands engaging in said cylinder bore and certain of said lands are arranged to constitute said valve means.

10. A combination as in claim 8 including cooperating stop valve means at the inner ends only of said housing and barrel to open and close said passage of said barrel to control mixed fluid flow therethrough.

11. A combination in a mixing valve: a housing provided with a cylinder bore and having hot water and cold water inlet ports and an outlet port, two of said ports being spaced axially; a valve barrel mounted to move axially in said cylinder bore and having valve means movable axially across said two spaced ports and positioned across the space between said two ports to open one of such ports gradually as the other is gradually closed, said valve barrel having an axial bore therein constituting a fluid passage, said barrel also having first and second port means therethrough between said cylinder bore and said barrel bore; and an adjustable volume control device mounted in said barrel bore adjacent one of said first and second port means for closing a chosen portion thereof to regulate flow therethrough.

12. In combination in a mixing valve: a valve housing having a cylinder bore with an inner end, a hot water passage to said bore, a cold water passage to said bore and a mixed water passage from said bore; a valve seat at the inner end of said bore; a valve barrel having rotary and axial movement in said cylinder bore to and from said seat and provided with axially spaced lands therearound forming a pair of axially spaced annular passage means, said barrel having a bore therein and first and second spaced port means therethrough between said barrel bore and said annular passage means respectively, one of said port means having communication with two of said water passages when said valve barrel is in open position, the other of said port means having communication with the third of said water passages, and said lands serving to cover and uncover at least two of said water passages; and adjustable control means movably mounted in said barrel bore adjacent one of said port means for covering a chosen portion thereof to adjust and maintain substantially constant the volume of water passing through such port means.

References Cited in the file of this patent

UNITED STATES PATENTS

| Number | Name | Date |
|---|---|---|
| 804,913 | Allen | Nov. 21, 1905 |
| 960,558 | Koken | June 7, 1910 |
| 1,066,213 | Moore | July 1, 1913 |
| 1,097,433 | Hill | May 19, 1914 |
| 1,308,829 | Young | July 8, 1919 |
| 1,313,590 | Engel | Aug. 19, 1919 |
| 1,508,938 | Powers | Sept. 16, 1924 |
| 1,517,990 | Hinkle | Dec. 2, 1924 |
| 1,882,953 | Saelzler | Oct. 18, 1932 |
| 1,943,865 | Hennessey | Jan. 16, 1934 |
| 2,140,292 | Jensen | Dec. 13, 1938 |
| 2,158,342 | Trader | May 16, 1939 |
| 2,308,127 | Symmons | Jan. 12, 1943 |